Dec. 22, 1970   W. RÜESCH   3,549,246
SPRING BIASED SPECTACLE TEMPLES
Filed Dec. 14, 1967
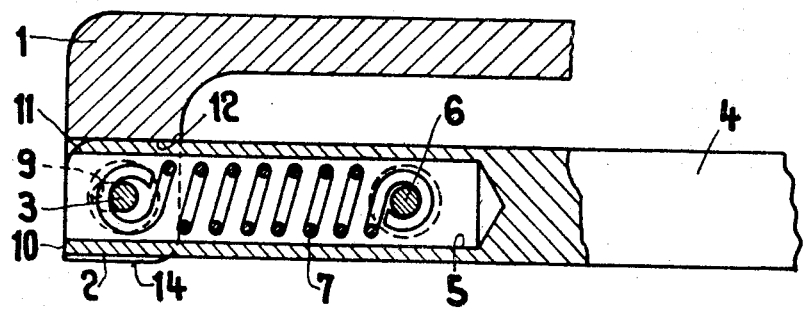
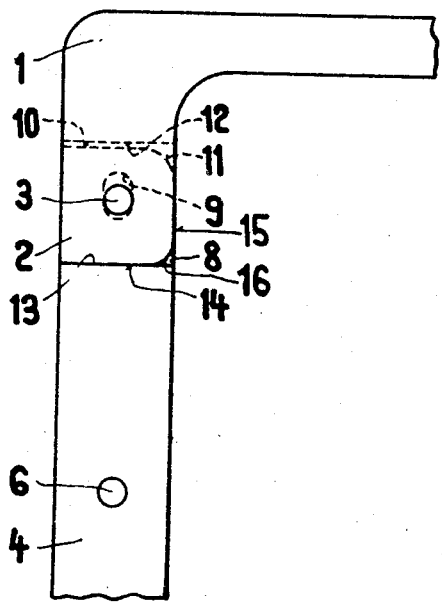
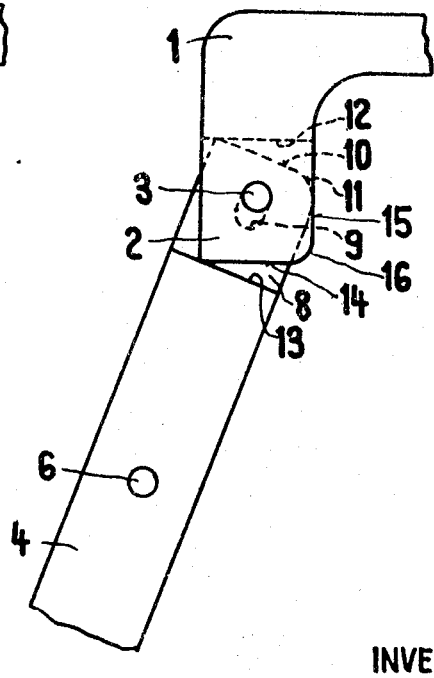
INVENTOR.
Willy Rüesch

United States Patent Office 3,549,246
Patented Dec. 22, 1970

---

3,549,246
SPRING BIASED SPECTACLE TEMPLES
Willy Ruesch, Minusio, Switzerland, assignor to Rivo S.A.,
Locarno, Switzerland
Filed Dec. 14, 1967, Ser. No. 690,533
Claims priority, application Switzerland, Dec. 20, 1966,
18,186, Patent 349,425
Int. Cl. G02c 5/16
U.S. Cl. 351—113      3 Claims

---

ABSTRACT OF THE DISCLOSURE

A spectacle-frame having bows adapted to be maintained in normal open and normal closed position by cam surfaces of the hinge of the bows urged against each other by spring means, said bows being elastically returned into normal open position when opened beyond this position.

---

This invention relates to a spectacle frame of which the bows may be swung out from a closed folded position into normal open position for use of the spectacles, and more particularly to a spectacle frame, wherein said bows are maintained in their normal open and closed position by cam surfaces urged against each other by spring means. By the action of these spring means and cam surfaces the bows are also returned to normal open position when the bows are opened beyond normal open position.

This invention aims in providing a particularly simple construction of a spectacle frame of the above type, which broadly comprises bows hinged each on a pivot pin in a manner allowing rotating and longitudinal displacement of the bow, cam surfaces on each bow and the adjacent hinge portion, a tension spring accommodated in a bore of each bow acting for urging said cam surface of the bow against the cam surface of the adjacent hinge portion, said cam portions being formed for maintaining said bows in their closed and normal open position respectively and for elastically returning the bows into the normal open position when they are opened beyond normal open position. The particular simplicity of this spectacle frame results from the possibility of making use of the end surfaces of the bows and of the hinge portions of the frame as cam surfaces urged against each other by said tension spring for determining the stable closed and open position of the bows and for producing the desired resetting forces.

The invention will now be explained in detail and by way of example with reference to an embodiment illustrated in the drawing, wherein FIG. 1 is a section of the one hinge with the bow in closed position, FIG. 2 is a top view of the one hinge with the bow in normal open position, and FIG. 3 is a top view of the one hinge with the bow in a position expanded beyond normal open position.

The spectacle frame 1 has two hinge forks 2 whereof the one is shown in the drawing and which are made in one piece with the frame. A pivot pin 3 is fixed in both legs of each hinge fork. The bow 4 made in one piece of metal has a longitudinal bore at its end connected to the hinge, an anchoring pin 6 crossing this bore near its rear end. A tension spring 7 disposed in the bore 5 is attached with its one end to the anchoring pin 6 and with its other end to the pivot pin 3. The hinge lug 8 of the bow 4 engaging into the hinge fork 2 has an oblong hole 9. The pivot pin 3 extends through this oblong hole so that the bow is hinged to the frame in a manner allowing rotating and longitudinal displacement of the bow. The hinge lug 8 of the bow has an end surface with an outer flat portion 10 ending in a sharp corner and an inner rounded portion 11. The fork of the hinge has a plane inner end surface 12. Two plane shoulders 13 are formed at the inner end of the lugs 8, adapted to engage cam surfaces 14 and 15 of the legs of the hinge fork. Cam surfaces 14 and 15 are disposed at substantially right angles to each other and at substantially equal distance from the pivot pin 3. A rounded transition surface 16 interconnects the cam surfaces 14 and 15.

Obviously a similar hinge and similar bow is provided at the other side of the frame 1.

Operation of the illustrated spectacle frame is as follows:

When the bow is closed as shown in FIG. 1, the plane shoulders 13 of the bow are urged against the side cam surface 15 of the hinge fork by pull of spring 7, whereby the bow is maintained in its closed folded position. During opening of the bow the shoulders 13 must be shifted along the cam surface 15 and pivoted relatively to the same whereby the bow is slightly displaced outwardly relatively to the pivot pin 3. The shoulders 13 then slide along the rounded transition surface 16 of the cam surfaces into the cam surfaces 14 of the hinge fork. After passing over the dead center position the bow snaps into its normal open position shown in FIG. 2 whereby the shoulders 13 of the bow rest upon the cam surfaces 14. Hereby the spring tension is somewhat reduced and the pivot pin 3 displaces to the other end of the oblong hole 9. When the bow is expanded beyond its normal open position as illustrated in FIG. 3, the shoulders 13 of the bow slide over the outer edge of the cam surface 14, whereby the bow is slightly displaced outwardly, the spring 7 is extended and the pivot pin 3 again moves to the inner end of the oblong hole 9. When the end position illustrated in FIG. 3 is reached, the outer corner of the hinge lug 8 of the bow abuts against the inner end surface 12 of the hinge fork whereby the outer end position of the bow is determined. When the bow is released from this position, it automatically returns to its normal open position shown in FIG. 2.

When the bow is closed or folded, the above operational steps occur in reversed order, whereby the bow snaps into its closed folded position under the action of spring 7 after having passed through its said dead center position.

What I claim is:

1. A spectacle-frame, comprising a lense frame having a rearwardly extending hinge portion at each end, a bow hinged to each hinge portion by a pivot pin attached to each hinge portion and extending through a pair of oblong holes in each bow thereby allowing longitudinal displacement of each bow relatively to the respective hinge portion, a tension spring in a bore in each bow with its one end anchored to said pivot pin and with its other end anchored to said bow thereby pulling the bow towards the hinge portion, a substantially flat cam surface on each bow extending transversely to the longitudinal extension of the bow and to the axis of said spring respectively and two substantially flat cam surfaces on each of said hinge portions at substantially right angles to each other and at substantially equal distances from said pivot pin, said cam surface of each bow being urged with the full force of said spring against the one or the other of said cam surfaces of the hinge portion when the bow is in its open or closed position respectively, the bows being thereby firmly held in these positions or efficiently retured thereto from neighboring positions.

2. A spectacle-frame according to claim 1, wherein a rounded transition surface is formed between said cam surfaces of each hinged portion and is disposed at a greater distance from the associated hinge pin than are said last mentioned substantially flat cam surfaces.

3. A spectacle-frame according to claim 1, wherein each bow comprises a hinge lug engaging into a hinge fork of the adjacent hinge portion, said oblong holes being provided in said lug, said hinge lug having an end surface rounded at its inner corner in order to clear the inner end surface of the hinge fork, the outer corner being substantially square and adapted to abut the inner end surface of the hinge fork to function as a stop.

References Cited

UNITED STATES PATENTS

| 1,191,855 | 7/1916 | Tuszka | 287—14 |
| 3,034,402 | 5/1962 | Alberetti | 351—113 |

FOREIGN PATENTS

| 588,579 | | Italy | 351—113 |

DAVID SCHONBERG, Primary Examiner

J. W. LEONARD, Assistant Examiner

U.S. Cl. X.R.

16—180